Patented Apr. 29, 1947

2,419,736

UNITED STATES PATENT OFFICE 2,419,736

SECONDARY AMINES OBTAINED BY CONDENSING DIARYL AMINES WITH ACETYLENE HYDROCARBONS

Arthur W. Sloan, Akron, Ohio, assignor to The B. F. Goodrich Company, New York, N. Y., a corporation of New York No Drawing. Application March 16, 1944, Serial No. 526,810

6 Claims. (Cl. 260—2)

This invention relates to new chemical compositions and pertains more specifically to the condensation products of diarylamines with organic compounds containing an acetylenic linkage.

These new chemical compositions are useful as intermediates in the preparation of other organic compounds and also as antioxidants for the preservation of organic substances which tend to deteriorate in the presence of oxygen, such as fish oils, linseed oil, tung oil, gasoline containing unsaturates, rubber, and the like. They are effective with any kind of rubber such as caoutchouc, balata, gutta percha, latex, reclaimed rubber, artificial rubber isomers, and such synthetic rubbers as polychloroprene, copolymers of butadiene with acrylonitrile, styrene, methyl acrylate, methyl methacrylate, isobutylene and other copolymerizable monomers. When used in rubber my new compositions are effective in amounts ranging from 0.1 to 5 percent or more of the rubber composition.

Among the diarylamines which may be used to prepare my new compositions are diphenylamine, phenyl-alpha-naphthylamine, phenyl-beta-naphthylamine, the ditolylamines, the phenyltolylamines, the dinaphthylamines, anilino tetraphenylmethane, phenyl-p-xenylamine, di-p-xenylamine, dianilinodiphenylmethane, p-hydroxydiphenylamine, p-aminodiphenylamine, N,N'-diphenyl-p-phenylenediamine, anilino-biphenylene oxide, anilino-acridine, 6-anilino-quinoline, p-chlorodiphenylamine, p-isopropoxydiphenylamine, phenylindanylamine, indanyl-alpha-naphthylamine, diindanylamine, and the like. The secondary amine reaction products of diarylamines with alcohols, aldehydes, and ketones are also the chemical equivalents of the diarylamines themselves for this reaction. The diarylamines containing only carbon, hydrogen, and nitrogen are preferred, however.

The compounds with which the diarylamines may be condensed to form my new compositions include all organic compounds containing an acetylenic linkage, that is a carbon to carbon triple bond. I prefer, however, compositions prepared from hydrocarbon compounds containing an acetylenic linkage, and particularly the alkyl acetylenes, that is, the alkynes. Among the compounds which may be employed are acetylene, methyl acetylene, butyne-1, butyne-2, vinyl acetylene, divinyl acetylene, pentyne-1, pentyne-2, 2-methyl-butyne-3, 3-methyl-butyne-1, hexyne-1, hexyne-2, heptyne-1, heptyne-2, heptyne-3, octyne-1, octyne-2, decyne-1, dodecyne-1, phenyl acetylene, diacetylene, dipropargyl, hexadiyne-2,4, propargyl alcohol, propargyl aldehyde, propargyl chloride, propargyl bromide, propargyl carbinol, methyl ethynyl carbinol, propargyl amine, gamma-hexyl propargyl alcohol, 2-hydroxy-decyne-3, methyl propargyl ether, ethyl propargyl ether, propiolic acid, tetrolic acid, dehydro-undecylenic acid, palmitolic acid, stearolic acid, tariric acid, behenolic acid, acetylene dicarboxylic acid, esters of such acids with saturated or unsaturated alcohols, esters of saturated or unsaturated acids with acetylenic alcohols, and other similar compounds.

The reaction is carried out in the presence of an acidic condensation catalyst; among suitable catalysts are hydrogen chloride, phosphoric acid, sulphuric acid, sodium bisulphate, zinc chloride, aluminum chloride, boron trifluoride, hydrofluoric acid, stannic chloride, ammonium bromide, iodine, and the like. In general, any of the well-known acidic condensation catalysts may be employed, that is, compounds which are strong acids or which produce acids upon hydrolysis or upon contact with organic materials. It appears that a mixture of several materials, the chemical structure of which is not fully known, results when the reaction is carried out as hereinafter described.

The reaction can be usually carried out at a temperature of 50° to 300° C., and at either atmospheric or elevated pressure, depending upon the reagents used. The relative proportion of the reagents used is not critical. In general, I have found it desirable to employ an excess of the diarylamine reagent, which serves as a solvent or medium for the reaction. Although the precise chemical structure of the products is not known, it is known that they are secondary amines because of the fact that they are readily acetylated with acetic anhydride.

The following specific examples are described in order more fully to illustrate the nature of my invention.

Example I

A mixture of about one molecular proportion of diphenylamine and 0.1 molecular proportion of aluminum chloride was heated to a temperature of about 100° C. About 0.5 molecular proportion of vinyl acetylene was slowly introduced into the mixture while maintaining the temperature at about 100° C. After the vinyl acetylene had been completely absorbed, the reaction mixture was cooled to room temperature and washed with a 10% aqueous sodium hydroxide solution. It was then washed with water and heated under a pressure of 1 mm. to a temperature of about 250 to 300° C. The unreacted diphenylamine, which was the only lower boiling fraction of the reaction mixture, was thereby removed. The residue, which was the desired product, was a hard, brittle, resinous material.

Example II

Vinyl acetylene was reacted with diphenylamine under the same conditions as described in Example I, except that the temperature of the reaction mixture was maintained at about 75° C. instead of 100° C. during the course of the reaction. After removal of the lower boiling diphenylamine, the residue was a dark viscous oil.

Example III

About 0.5 molecular proportion of acetylene was reacted with one molecular proportion of diphenylamine under the conditions described in Example I. The temperature of the reaction mixture was maintained at about 100° C. After removal of the unreacted diphenylamine from the product by heating under reduced pressure, the residue was a dark, extremely viscous oil.

As an indication of the antioxidant properties of these new compositions, they were incorporated in the following rubber composition, in which the parts are by weight:

| | |
|---|---|
| Rubber | 100.0 |
| Zinc oxide | 5.0 |
| Sulfur | 3.0 |
| Carbon black | 50.0 |
| Stearic acid | 3.5 |
| Pine tar | 3.0 |
| Mercaptobenzothiazole | 1.0 |
| Antioxidant | 2.0 |

The compositions containing the various antioxidants were vulcanized by heating 60 minutes at 279° F. The ultimate tensile strength and ultimate elongation of the samples were then determined, and the samples were aged for 96 hours in oxygen at 70° C. and 300 lbs. per sq. in. pressure, and the per cent loss in ultimate tensile strength and ultimate elongation was determined. The results are given in the following table:

| Antioxidant | Per cent Loss | |
|---|---|---|
| | Tensile strength | Elongation |
| None | 73 | 41 |
| Product of Ex. I | 46 | 26 |
| Product of Ex. II | 36 | 14 |
| Product of Ex. III | 33 | 15 |

It is clear from these results that my new compositions are powerful antioxidants. Similar results may be obtained when other diarylamines or other acetylenic compounds are employed.

Although I have herein disclosed specific embodiments of my invention, I do not intend to limit myself solely thereto, but to include all of the obvious variations and modifications within the spirit and scope of the appended claims.

I claim:

1. The secondary amine product obtained by condensing a diarylamine containing only carbon, hydrogen and nitrogen, and having all its nitrogen present in the secondary amine group, with a hydrocarbon containing an acetylenic linkage, in the presence of an acidic condensation catalyst and at a temperature in the range of 50 to 300° C.

2. The secondary amine product obtained by condensing a diarylamine containing only carbon, hydrogen and nitrogen, and having all its nitrogen present in the secondary amine group with an alkyne in the presence of an acidic condensation catalyst and at a temperature in the range of 50 to 300° C.

3. The secondary amine product obtained by condensing diphenyl amine with a hydrocarbon containing an acetylenic linkage in the presence of an acidic condensation catalyst and at a temperature in the range of 50 to 300° C.

4. The secondary amine product obtained by condensing diphenyl amine with acetylene in the presence of an acidic condensation catalyst and at a temperature in the range of 50 to 300° C.

5. The secondary amine product obtained by condensing diphenyl amine with vinyl acetylene in the presence of an acidic condensation catalyst and at a temperature in the range of 50 to 300° C.

6. The secondary amine product obtained by condensing phenyl-beta-naphthylamine with a hydrocarbon containing an acetylenic linkage in the presence of an acidic condensation catalyst and at a temperature in the range of 50 to 300° C.

ARTHUR W. SLOAN.

REFERENCES CITED

The following references are of record in the file of this patent:

UNITED STATES PATENTS

| Number | Name | Date |
|---|---|---|
| 1,893,249 | Schetelig et al. | Jan. 3, 1933 |
| 1,907,560 | Nieuwland | May 9, 1933 |
| 2,123,733 | Keyssner | July 12, 1938 |
| 2,087,079 | Wolff | July 13, 1937 |
| 2,238,682 | Dykstra et al. | Apr. 15, 1941 |